Oct. 7, 1969　　　H. R. CLEMENTS　　　3,470,656
ON-SITE FABRICATED GLASS REINFORCED RESIN STORAGE TANK
Filed Sept. 13, 1967　　　　　　　　　　　　　9 Sheets-Sheet 1

INVENTOR
H. R. CLEMENTS
BY
George E. Pearson
ATTORNEY

Oct. 7, 1969  H. R. CLEMENTS  3,470,656
ON-SITE FABRICATED GLASS REINFORCED RESIN STORAGE TANK
Filed Sept. 13, 1967  9 Sheets-Sheet 2

INVENTOR
H. R. CLEMENTS
BY
George E. Pearson
ATTORNEY

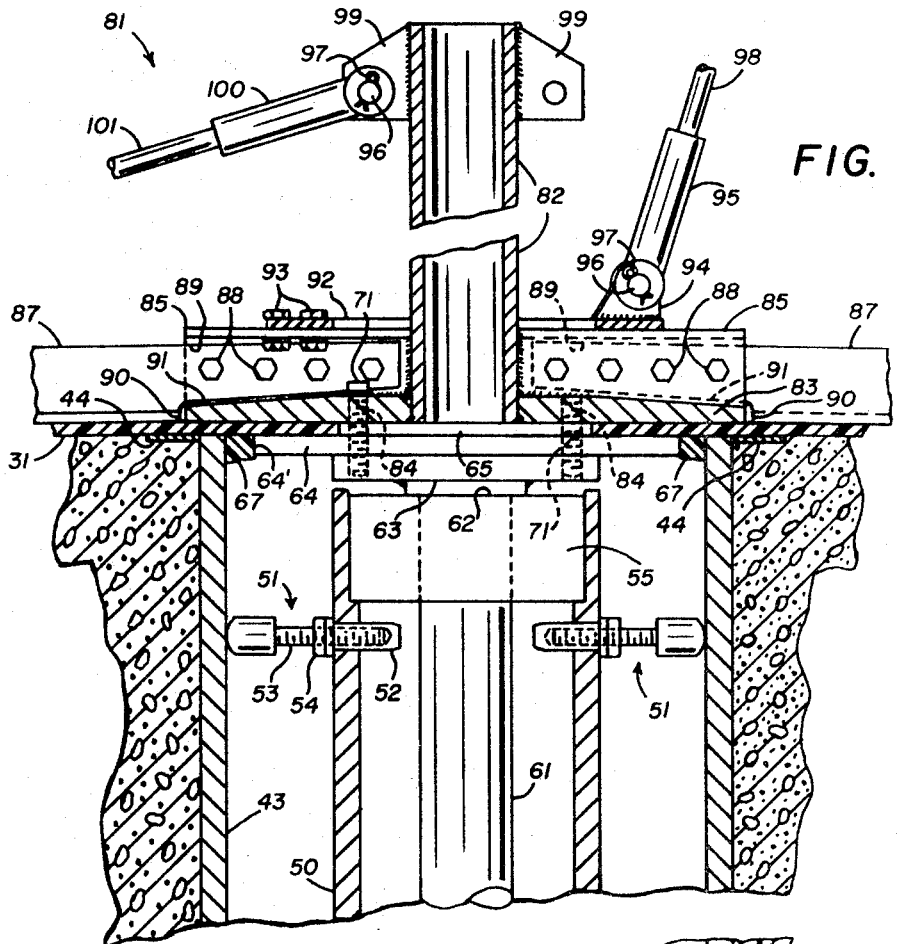
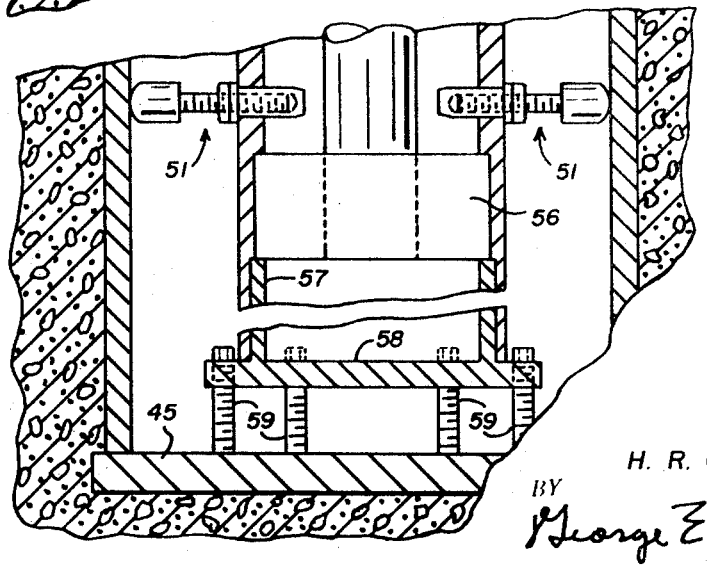
FIG. 4

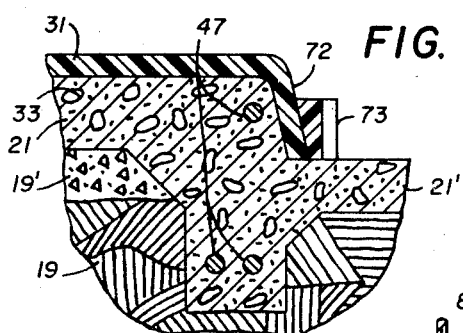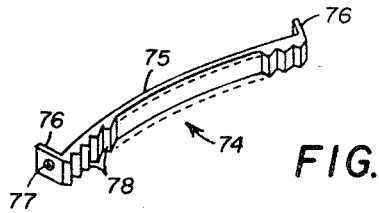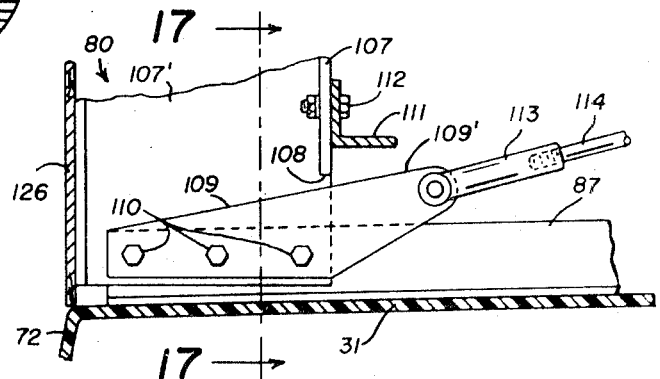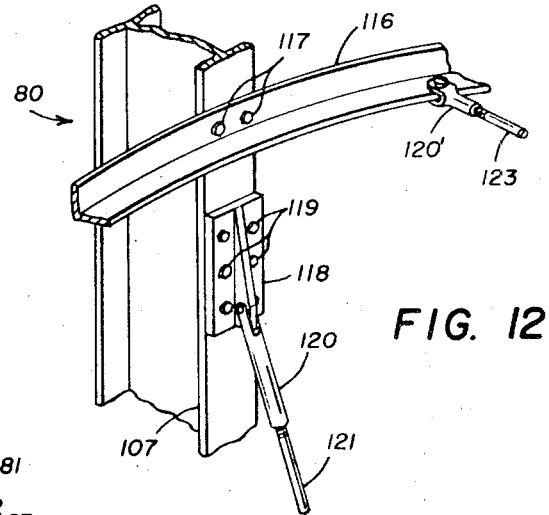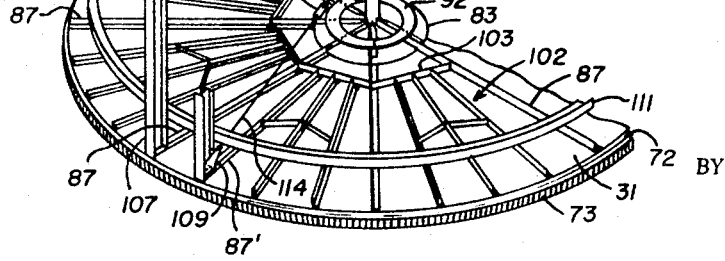

Oct. 7, 1969 H. R. CLEMENTS 3,470,656
ON-SITE FABRICATED GLASS REINFORCED RESIN STORAGE TANK
Filed Sept. 13, 1967 9 Sheets-Sheet 5
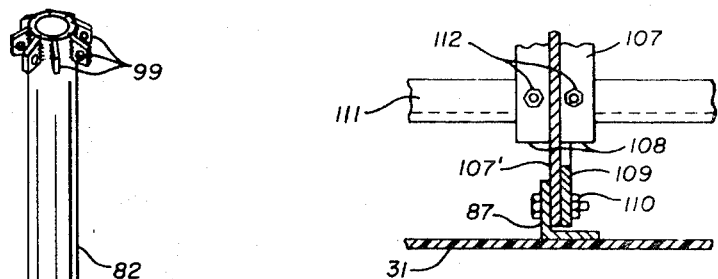
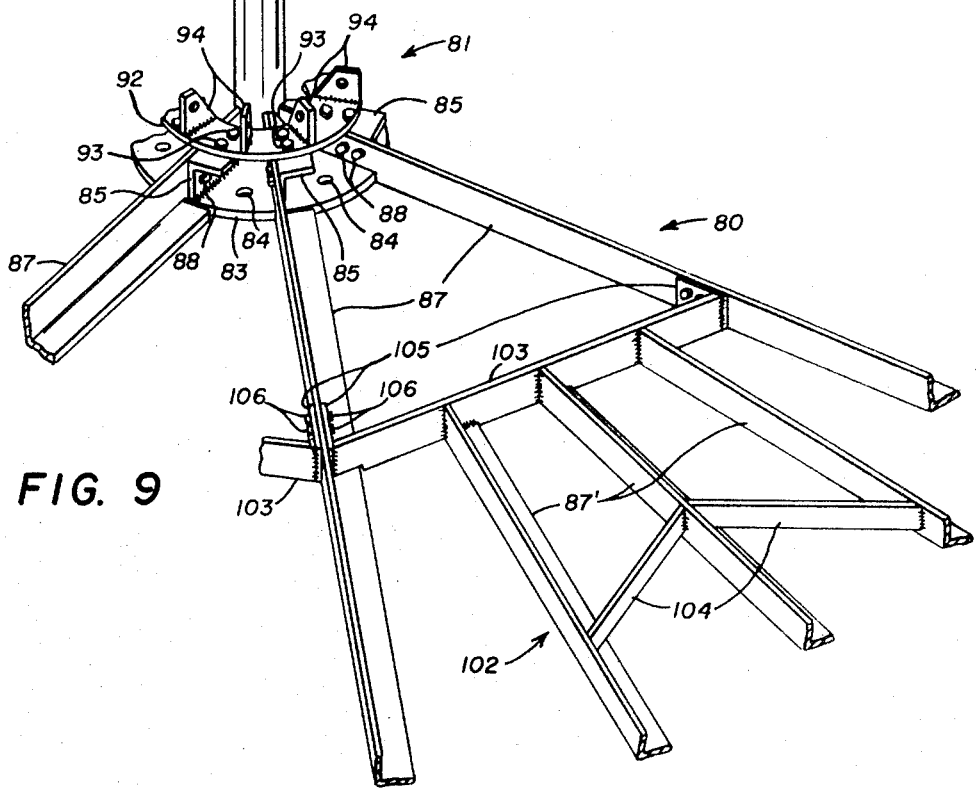
INVENTOR
H. R. CLEMENTS
BY
George E. Pearson
ATTORNEY Oct. 7, 1969  H. R. CLEMENTS  3,470,656
ON-SITE FABRICATED GLASS REINFORCED RESIN STORAGE TANK
Filed Sept. 13, 1967  9 Sheets-Sheet 7

INVENTOR.
H. R. CLEMENTS
BY
George E. Pearson
ATTORNEY

Oct. 7, 1969  H. R. CLEMENTS  3,470,656

ON-SITE FABRICATED GLASS REINFORCED RESIN STORAGE TANK

Filed Sept. 13, 1967  9 Sheets—Sheet 9

INVENTOR.
H. R. CLEMENTS
BY
*George E. Pearson*
ATTORNEY

United States Patent Office 3,470,656
Patented Oct. 7, 1969

3,470,656
ON-SITE FABRICATED GLASS REINFORCED
RESIN STORAGE TANK
Harry R. Clements, Bonita, Calif., assignor to Rohr
Corporation, a corporation of California
Filed Sept. 13, 1967, Ser. No. 667,399
Int. Cl. E04g 11/04; E04b 1/346; E04h 7/24
U.S. Cl. 52—2                                    8 Claims

ABSTRACT OF THE DISCLOSURE

A large capacity storage tank is manufactured on-site of glass reinforced resin, using portable equipment. A glass-resin layer, ultimately the bottom of the tank, is formed on a concrete base for the tank, and a steel framework cylindrical mandrel constructed on the glass-resin layer is rotated with the layer on an air bearing developed between the layer and concrete base. Resin wetted glass roving is wound on the rotating mandrel from an elevator which moves vertically at one side of the mandrel. When the cylindrical wall is complete and integrated with the bottom layer, they are settled on the base by cutting the air pressure to the air bearing. A membrane, applied to the top of the cylindrical wall, is dome-shaped by internal air pressure and sprayed with glass resin to form the tank cover while the tank is rotating.

PRIOR ART AND PRESENT INVENTION COMPARED

Large tanks are required in many industrial uses of the same, as for example, in water storage and in chemical and petrochemical uses where, in addition to the storage requirement, corrosive resistance service must also be provided in the chemical uses.

Storage containers commonly used in the chemical process industry contain various chemicals of varying degrees of aggressiveness. These containers, which in the past have been used with varying degrees of success, have been made from such materials as glass, aluminum, steel, stainless steel, rubber lined carbon steel, or other materials which have internal coatings designed to resist the contained chemicals.

For the past several years glass reinforced polyester tanks have found their way into this corrosion resistant chemical service. These tanks of necessity have been factory fabricated in small capacities, less than 25,000 gallons, and shipped to the site for installation. Alternatively, larger capacity tanks have been filament wound in small segments and bonded together into a complete tank at the site of use. In other instances, huge tanks have been fabricated by prior art methods using conventional hand lay up techniques.

The present invention offers a method of fabricating extremely large tanks of the aforedescribed type at their use location and provides for machine fabrication of the same using less expensive materials and achieving a more uniform machine made product by the process of filament winding. As otherwise expressed, by the process of the present invention, the tank is filament wound on site and completed thereat with integrally formed top and bottom layers, thereby insuring a full monolithic corrosion resistant surface reinforced by the filament wound portion of the tank.

SUMMARY OF THE INVENTION

According to the on-site rotative tank fabrication method of the present invention, a glass-resin tank bottom layer is formed on a concrete base having provision for introducing air under pressure between the base and the bottom layer. A "birdcage" type knockdown steel framework mandrel is then constructed on the bottom layer for rotation therewith in supported relation, at least in part, by the air bearing afforded by the air under pressure between the base and the bottom layer. A glass-resin tank sidewall is then built up on the rotating mandrel and integrated with the bottom layer. The sidewall is developed in successive layers of glass and resin including layers of resin-wetted glass rovings filament wound on the mandrel from an elevator which is moved up and down alongside the rotating mandrel. When the sidewall is completed, the mandrel is either completely or partially removed, and a flexible membrane is secured to the top of the tank sidewall. Air under pressure is then admitted to the tank to expand the membrane into a dome shape. The expanded membrane is then sprayed with glass-resin to form the glass-resin top layer of the tank and to integrate the same with the sidewall, the tank for this purpose being rotated or held stationary, as desired.

The "birdcage" mandrel feature allows a variety of mandrel diameters to be used with one mandrel set and being removable, is reusable. The diameters, moreover, may range from the order of 13 feet upwards of a hundred feet, and the gallonage capacity may range from a few thousand gallons to the order of a million gallons.

The tank fabrication process of the present invention has a marked cost advantage when compared to the cost of constructing metal tanks of special types required when exceptionally corrosive contents are to be held, or compared to prior art methods of fabricating glass-resin tanks. The tank fabrication method of the present invention, moreover, has universality of design-application suitability which renders the same usable for any corrosion resistant design and for any type of structural requirements as where conditions requiring special design consideration such, for example, as earthquakes, wind, and snow may be present.

OBJECTS OF THE INVENTION

The objects of the present invention are:

(a) To provide a new and improved method of constructing a large capacity fiber-reinforced resin tank on-site.

(b) To provide a new and improved method of filament winding such a tank.

(c) To provide a method of rotating the tank during the filament winding thereof.

(d) To provide an air bearing method of supporting the tank during rotation thereof.

(e) To provide drive means by which the tank may be rotated during construction while supporting on the air cushion.

(f) To provide large diameter rotatable mandrel means for filament winding of the tank sidewall.

(g) To provide a method and means for fabricating the tank cover.

(h) To provide a tank according to the aforesaid methods.

These and other objects, features and advantages of the present invention will become more fully apparent as the description proceeds with reference to a preferred embodiment of the invention disclosed in the accompanying drawings wherein:

THE DRAWINGS

FIG. 4 is an enlarged, fragmentary, vertical sectional view of the bearing opening in the slab and showing the bearing assembly and hub portions of the mandrel supported thereon;

FIG. 6 is a fragmentary vertical sectional view in the peripheral region of the lab raised portion showing the resin-glass layer and its ring gear;

FIG. 7 is a view in perspective of a molding member used in forming the ring gear on the tank bottom layer;

FIG. 8 is a fragmentary perspective view showing the framework mandrel in superposed relation to the tank bottom layer;

FIG. 9 is a fragmentary perspective view of the hub portion of the framework mandrel showing its stub shaft assembly;

FIG. 11 is a fragmentary elevational view of a mandrel upright member showing its manner of attachment to mandrel spoke and ring members;

FIG. 12 is a fragmentary perspective view of a mandrel upright member showing its manner of attachment to mandrel ring and tensioning members;

FIG. 17 is a fragmentary sectional view of the mandrel taken along the line 17—17 of FIG. 11;

THE SPECIFICATION

Figure 1:
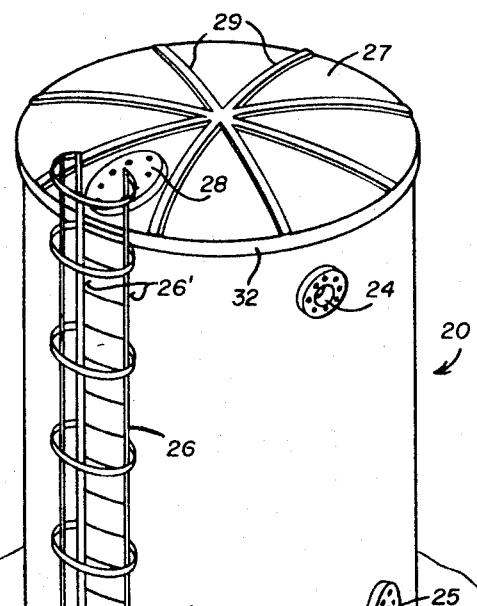
FIG. 1 is a view in perspective of a glass-resin tank constructed in accordance with the on-site fabrication process of the present invention.

Referring now to the drawings and first more particularly to FIG. 1 thereof, the numeral 20 generally designates a tank which has been constructed of glass reinforced resin in accordance with the on-site process of fabrication of the present invention. Tank 20, by way of example, is of the order of 18 feet in diameter by 30 feet high, to thus provide a tank capacity of the order of 50,000 gallons.

Tank 20 is based upon and secured to a suitable support which, as disclosed, is a concrete slab 21 layed upon the ground 19. A peripheral ring of concrete 22 is secured to the lab and serves to anchor the tank to the slab in a manner which will best appear infra from the description of the fabrication of the tank.

The tank sidewall 23 is filament wound with resin impregnated glass rovings and provided with upper and lower inlet and outlet ports 24 and 25. The sidewall also supports a caged ladder 26 which is anchored in concrete ring 22 and has fasteners 26′ suitably secured to or embedded within the sidewall 23. Ladder 26 leads to a manhole provided in the top 27 of the tank. The manhole has a cover 28, and the top is dome shaped and reinforced by diametrically extending glass-resin formed cross ribs 29 which are generally of 2″ x 4″ configuration.

Tank top 27 and bottom 31 are both formed of resin impregnated chopped glass rovings to a thickness of the order of 0.5 to 0.7 of an inch, the tank wall 23 also being of this same order of thickness. Top cover 27 overlaps the top peripheral edge portion of the sidewall to thus provide a reinforcing resin-glass flange 32 at the top of the tank.

Whereas glass is referred to herein as an exemplary reinforcing filament or roving material, it will be understood that fiber materials of other types may be employed such, for example, as vegetable fibers such as jute, hemp, and sisal, synthetic fibers such as polyester and polypropolene, drawn metallic wire or boron filaments, and coated, plated, or cladded combinations of such filaments.

Figure 3:
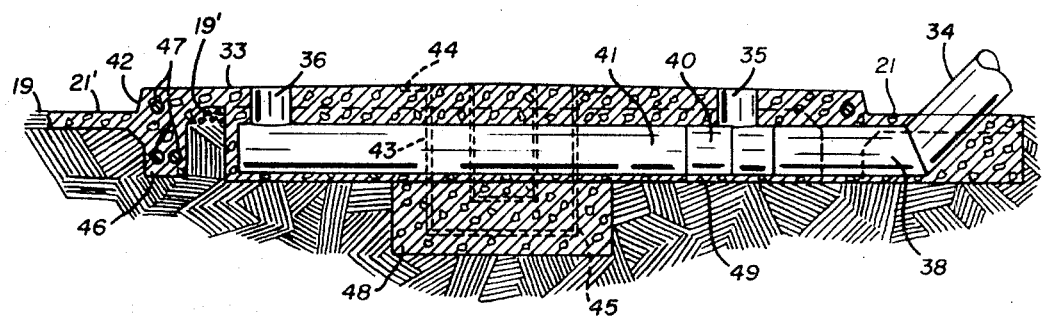
FIG. 3 is a sectional view of the ground-laid slab taken substantially along the line 3—3 of FIG. 2.
Figure 2:
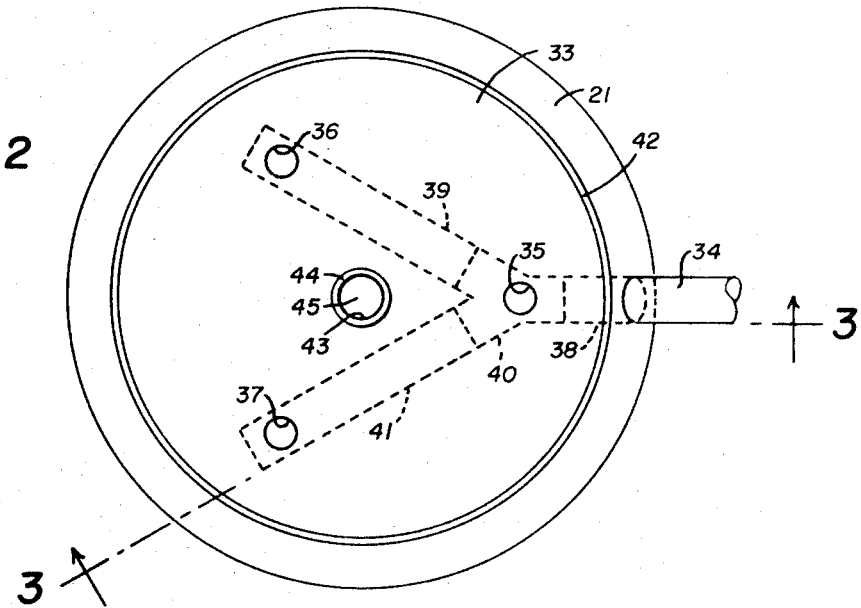
FIG. 2 is a plan view of a ground-laid slab used in the construction of the tank.

In the fabrication of tank 20, slab 21 is formed circularly, for example, as depicted in FIG. 2, and disposed substantially at ground level at its perimeter. A circularly raised central portion 33, see also FIG. 3, is provided which stands at its perimeter about 6 inches above the level of the remaining portion of the slab and rises to about 8 inches at the center. An air duct 34 of the order of 16 inches in diameter rises diagonally from the slab at ground level. Below the slab, duct 34 interconnects with raised level air outlet ducts 35, 36 and 37 by means of subsurface ducting 38, 39 and 41 which interconnect at the Y-duct 40. Ducting suitable for the purpose may be of the order of 20 gauge galvanized iron.

The upwardly extending peripheral face 42 of the circular raised portion 33 is sloped inwardly and has a diameter conforming substantially with that of tank 20, it being understood that the size of the tank is largely determined by the dimension given to slab 21 and its raised portion 33 in accordance with the tank capacity desired. A tubular metal casing 43 having a one inch wall, a top flange 44 and bottom closure plate 45, FIG. 4, provides a central opening in the slab of the order of 36 inches deep and 18 inches in diameter, the bottom plate 45 being substantially thicker than the sidewall for a purpose subsequently to appear.

Slab 21 preferably has a cross sectional configuration disclosed in FIG. 3 from which it may be seen that the peripheral ground level or skirt portion 21′ has a reduced thickness and is layed directly on the ground 19 whereas the raised portion 33 has a footing 46 and is reinforced with steel bars as indicated at 47. The top edge of casing 43 and the upper surface of its flange 44 are flush with the upper surface of the concrete raised portion 33. Otherwise the tubular casing 43, its flange 44 and bottom closure plate 45 are embedded within and fully enclosed by the concrete which thus extends to a considerable depth at the center of the slab, as depicted at 48. The concrete also encloses the ducting 34–41 and thus, in the region of the ducting, the concrete extends to an intermediate depth 49 into the ground 19. The remaining portion of the slab making up the central slab portion 33 has a reduced thickness supported by a crushed rock layer 19′.

Referring now to FIG. 4, a thick wall metal tube 50 having a thickness of about 1 inch is secured with casing tube 43 by means of a plurality of suitably spaced, threadedly adjustable spacer jacks 51. Each jack comprises a threaded insert 52 secured as by welding to tube 50 and a threaded jack screw 53 having a lock nut 54. By selective adjustment of jacks 51, tube 50 is both axially aligned vertically and centered with respect to the circular raised portion 33 of slab 21.

Tube 50 is appropriately counterbored to receive a pair of bearings 55 and 56 which are spaced apart within the tube by approximately 24 inches. The lower bearing 56 is held in this position by means of the insertable spacer tube 57 which has a bottom plate 58. Plate 58 extends radially beyond the tube to receive spaced supporting screws 59 which serve adjustably to space plate 58 from casing bottom plate 45 and thus vertically adjust the position of tube 50, as required, withing casing 43. A shaft 61 is inserted in the spaced bearings such that the lower bearing 56 carries a radial load, and the upper bearing 55 carries both a radial load and a thrust load where a shoulder 62 on the shaft abuts with the bearing. Bearings 55 and 56, for the foregoing purpose, have a thrust capacity of the order of 25,000 lbs. and a radial capacity of the order of 50,000 lbs.

Shaft shoulder 62 has disposed thereabove first, second and third shaft flanges 63, 64 and 65, respectively. Flange 63 extends into overlying spaced relation with respect to the end of tube 50, and flange 64 extends into closely spaced relation with respect to the upper wall portion of tube 43. The upper surface of flange portion 64 is made flush with the upper edge of tube 43 and upper surface of flange 44 by adjustment of set screws 59, aforementioned, and thus, the thickness of the upper reduced diameter flange portion 65 determines the thickness of the plastic tank bottom layer 31, the fabrication of which is about to be described.

In the preparation of slab 21 for laying down thereon of the plastic bottom layer 31, the upper surface of raised portion 33 and its somewhat off-vertical inclined sidewall surface 42, FIG. 3, are treated with an application of a suitable epoxy sealant to seal these surfaces and prevent cement flaking. This sealant may be epichlorohydrin Bisphenol A which is available commercially as Shell Chemical Company "Epon #828." These surfaces, the upper face of flange 65, FIG. 5, and the peripheral edge 64' of flange portion 64 are next sprayed with a suitable wax parting agent. This parting agent may be carnauba wax in a solvent such as acetone and available commercially as Ram Chemical Company "Plastilease #334." Chopped glass-resin is then packed within the circumferential gap between the inner surface of tube casing wall 43 and the peripheral edge surface 64' of flange 64 to provide a resin-glass sealing ring 67 which is flush with the upper surfaces of flanges 44 and 64. When ring 67 has hardened, its upper surface is also sprayed with the parting agent.

Using a conventional gun for spraying resin impregnated chopped glass rovings, three separate roughly circular areas of about 2 feet in diameter are sprayed to a depth of about ⅛ inch onto a continuous area of the wax sprayed raised surface 33 of the concrete slab 21. When these circular areas have hardend, the same as picked up ad placed respectively over the air outlet openings 35, 36 and 37, as covers therefor, the cover for opening 35 being designated 68, FIG. 5. The resin-glass layer 31 is now laid down with the gun, and the covers for the openings 35-37 become integrated with the tank bottom layer 31. The parting layer on the upper surface of the resin-glass sealing ring 67 prevents integration of the same with tank bottom layer 31, and the parting coating on the peripheral edge of flange 64 permits the integral flange assembly 63-65 and bottom layer 31, now bonded thereto, to rotate as a unit with respect to ring 67 which remains fixed to the tube wall 43. The parting layer on slab surface 33 and flange 44, of course, assures that the plastic bottom layer is free to move with respect thereto.

Figure 5:
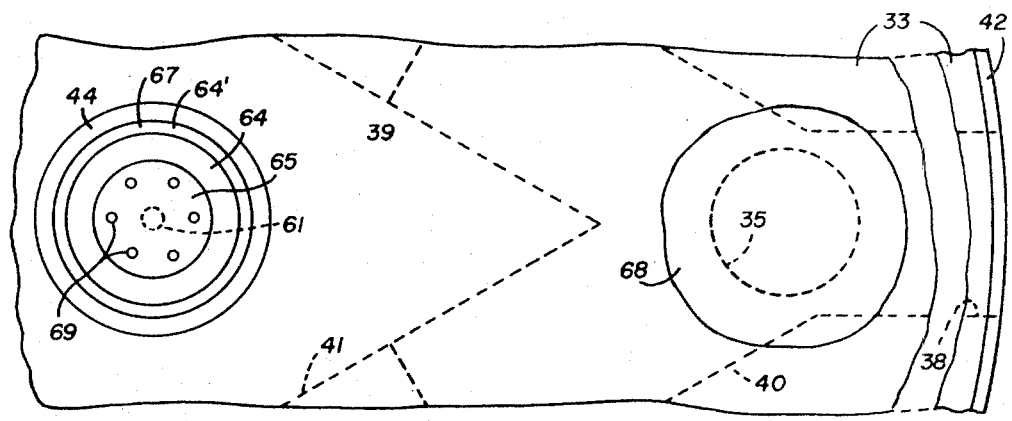
FIG. 5 is an enlarged fragmentary view similar to FIG. 2 and showing the bearing assembly and temporary cover arrangement for the air outlet openings prior to the laying down of the resin-glass bottom layer of the tank.

As best seen in FIG. 5, shaft flange 65 has a plurality of circularly spaced, threaded holes 69 for receiving bolts 71, FIG. 4. While plastic layer 31 is being layed down, openings 69 are suitably protected from the applied plastic.

When layer 31 and its skirt 72, FIG. 6, have become hardened and the skirt suitably trimmed, as required, around its peripheral edge, a resin-glass ring gear 73 is formed on the skirt and integrated therewith.

Ring gear 73 is formed by use of segmented molding menbers such as member 74, FIG. 7. Member 74 comprises a length of thin sheet steel 75, or other flexible material, of the order of six feet long and 4 inches wide, and having end portions bent back at 76 and perforated at 77. Gear teeth 78, molded of silicone rubber, or similar rubber-like material of a degree of hardness of approximately 60 to 70 shore, are molded onto the sheet steel member 75 with a tooth configuration corresponding to that desired for the teeth on ring gear 73.

In forming gear 73, two or more of the ring gear molding members 74 are placed in spaced adjacency to the skirt 72, FIG. 6, and concentrically with respect to the axis of shaft 61, FIG. 4, and then connected together at their adjacently disposed end portions 76 by suitable fastening means which utilize the aligned openings 77. A viscous resing impregnated with chopped filament glass material is then poured into the space between the skirt 72 and mould members 74. When the glass-resin material has hardened, the process is repeated, as required, to extend the teeth of ring gear 73 entirely around the skirt.

Tank wall 23, FIG. 1, is wound on a knockdown metal framework mandrel generally designated 80, FIGS. 8 to 12, which is constructed and supported on the plastic tank bottom wall 31. To this end, mandrel 80 comprises a flanged stub shaft assembly generally designated 81 which, in turn, comprises a short tubular stub shaft 82 of the order of 4 inches in diameter. Stub shaft 82 is disposed coaxially with sub-surface shaft 61, FIG. 4, and extends upwardly about 3 feet above its upper flange 65.

As may best be seen in FIGS. 4 and 9, stub shaft 82 has a circular anchor or attachment plate 83 secured thereto at the bottom thereof, as by welding. Plate 83 has a plurality of holes 84 for passing the aforementioned bolts 71, in FIG. 4, which thus serve to secure stub shaft 82 to a sub-shaft 61 for rotation therewith on the bearing supports 55 and 56.

A plurality of stub angle members 85, eight in number, are also secured, as by welding, to shaft 82 and to its anchor plate 83, these stub angle members being equispaced and directed radially from the shaft in spoke fashion. The short stub angle members 85 serve as attachment means for elongated mandrel spoke members 87 which extend radially to the perimeter 72 of the plastic bottom layer 31, FIGS. 8 and 11. Like the short member 85, the spoke members 87 are also of angular configuration, the upwardly extending angle leg portion of each being secured by a plurality of fasteners such as the bolts 88, FIGS. 4 and 9, to the depending leg portion of its associated short angle member 85. Members 87 rest upon the plastic bottom layer 31 which tapers radially downwardly somewhat because, it will be recalled, the concrete raised portion 33 is about 2 inches higher at the center than at the perimeter. Thus, the upper edge of each of the mandrel spoke members, as depicted at 89, FIG. 4, extends at a small acute angle with respect to the horizontally disposed upper angle leg of the associated short member 85. The attached end portion of each spoke member 87, moreover, is partially cut away to clear the circular plate 83, the upper surface of which tapers radially downwardly. Accordingly, the horizontally disposed angle leg of each spoke member 87 is terminated, as indicated at 90, and the vertical angle leg is tapered upwardly, as indicated at 91, to conform with the taper in plate 83.

A ring plate 92, FIGS. 4 and 9, encircles stub shaft 82 in spaced relation therewith and is secured to the horizontal leg of each of the stub angle members 85 as by the bolt fasteners 93. A plurality of radially disposed and equi-spaced upstanding, apertured lugs 94, eight in number, are secured to ring plate 92, as by welding, and each of these lugs serves to make connection with a clevis, such as clevis 95 depicted in FIG. 4, the clevis being secured to the lug in the usual manner as by the clevis pin 96 and its retaining cotter pin 97. Clevis 95 is secured to a rod 98 in a well known manner such as by a threaded connection therewith. In similar manner, the upper end of stub shaft 82 has a plurality of radially disposed and equi-spaced apertured lugs 99, eight in number, secured thereto, as by welding, and extended radially therefrom. Each lug 99 similarly secures a clevis 100 and its associated rod 101. As may best be seen in FIG. 16, lugs 94 are displaced counterclockwise from lugs 99 by 1/32 of the mandrel perimeter for a reason subsequently to appear.

Figure 16:
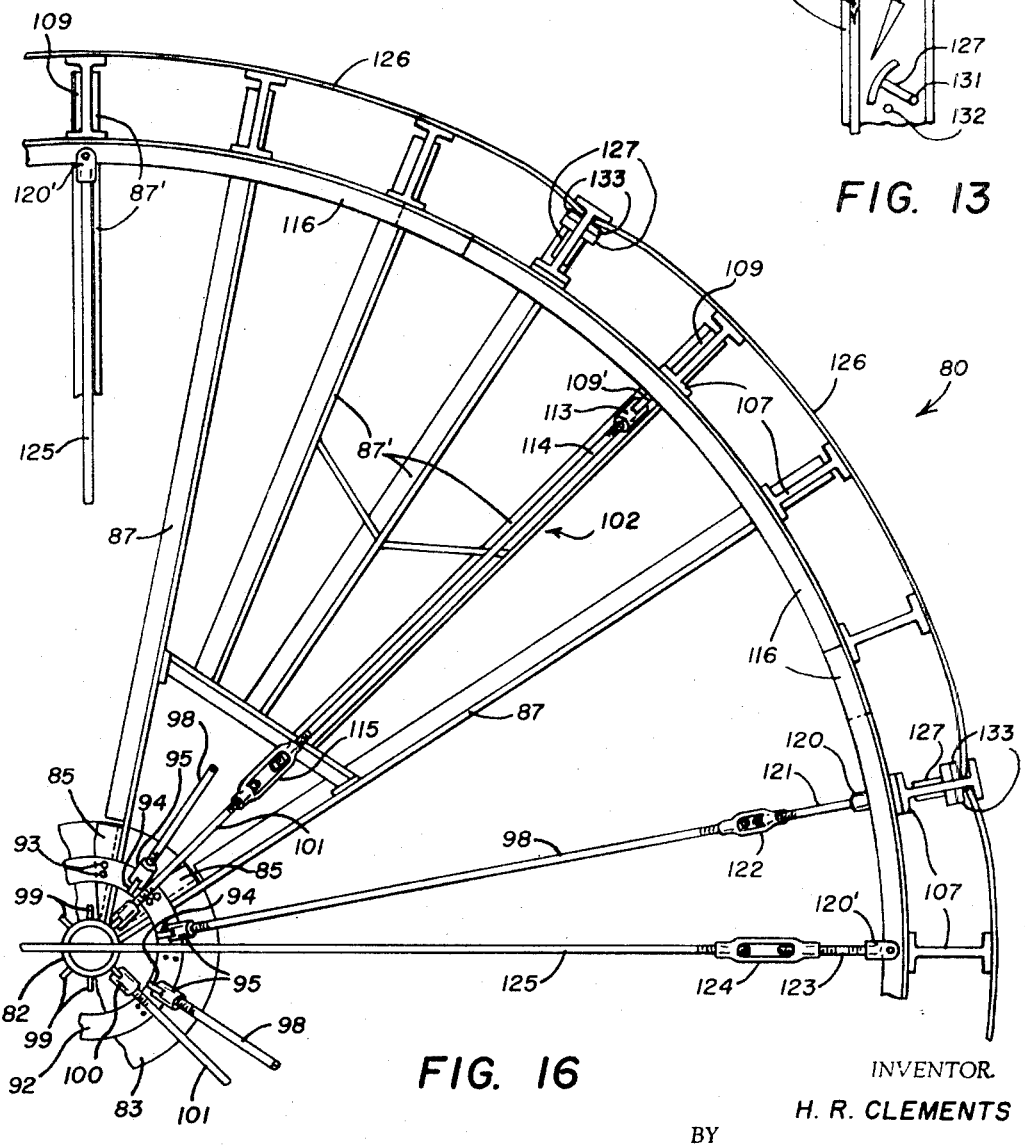
FIG. 16 is a quarter sectional top view of the mandrel showing the board covering in position thereon.

Between each pair of adjacently disposed spoke members 87 there is releasably secured a unitary spoke frame generally designated 102, FIGS. 8, 9 and 16, which provides three additional mandrel spoke members 87' for each pair of members 87. Thus, mandrel 80, in all, comprises 32 spoke members in the arrangement disclosed, it being recalled that there are eight of the principal spoke members 87 employed for the purpose.

Spoke members 87' at their inner ends are secured, as by welding, to a chord member 103, and are additionally braced intermediate their ends by the diagonally disposed members 104 which are suitably secured thereto, as by welding. As best seen in FIG. 9, brackets 105 are secured, as by welding, to the ends of chord member 103 and set at an appropriate angle thereto so as to interfit between the spaced radial spoke members 87, as shown, when the unit 102 is interposed therebetween. Unit 102 is secured in this position to the members 87 by bolt fasteners 106 which are received in suitable openings provided therefor in the brackets and spoke members, and the same fasteners 106 may serve to secure both brackets 105 on opposite sides of each spoke member 87.

The vertical sidewall of mandrel 80 comprises a plurality of I-section upright members or beams 107, each of which is secured at its lower end to one of the mandrel spoke members 87 or 87', as the case may be. As best seen in FIGS. 11 and 17, the lower end portion of each member 107 is cut away, as indicated at 108, to clear the associated spoke member and, in certain instances only, to also clear an angle clevis bracket 109 as well whereby these members may thus be placed against the opposite sides of the center web 107' of the I-section and secured thereto as by the bolt fasteners 110.

It will be understood in those instances in which the clevis brackets 109 are omitted and the spoke members only are secured to their respective upright members, that the same bolt fastener arrangement 110 is employed to secure the parts together. The upright members 107 at their lower end portions are also secured to each other to form a unitary structure by an angle section ring member 111 which is secured to each upright member by bolt fasteners 112, as best seen in FIGS. 11 and 17.

The vertical leg of bracket 109 tapers upwardly, FIG. 11, and terminates in an apertured ear 109' to receive a clevis 113 which carries a rod 114. Rod 114 is connected by a turnbuckle 115, FIG. 8, to rod 101, see also FIG. 4, there being eight such sets of rod and clevis supports for the mandrel whereby the mandrel wall comprising the uprights, upon suitable adjustment of the turnbuckles may be substantially supported from the stub shaft 82, thereby to distribute the load uniformly about the perimeter of the mandrel. Thus, eight of the uprights 107 will have a clevis bracket 109 secured therewith to a mandrel spoke member. It will be noted in FIG. 8, moreover, that rod 114 leads to an upright 107 which is secured to a spoke member 87' which is disposed adjacent to and advanced counterclockwise ahead of a principal spoke member 87. Accordingly, it will be understood that this same relationship will obtain with respect to the seven other similarly employed spoke members 87' and their adjacently disposed members 87.

Figure 10:
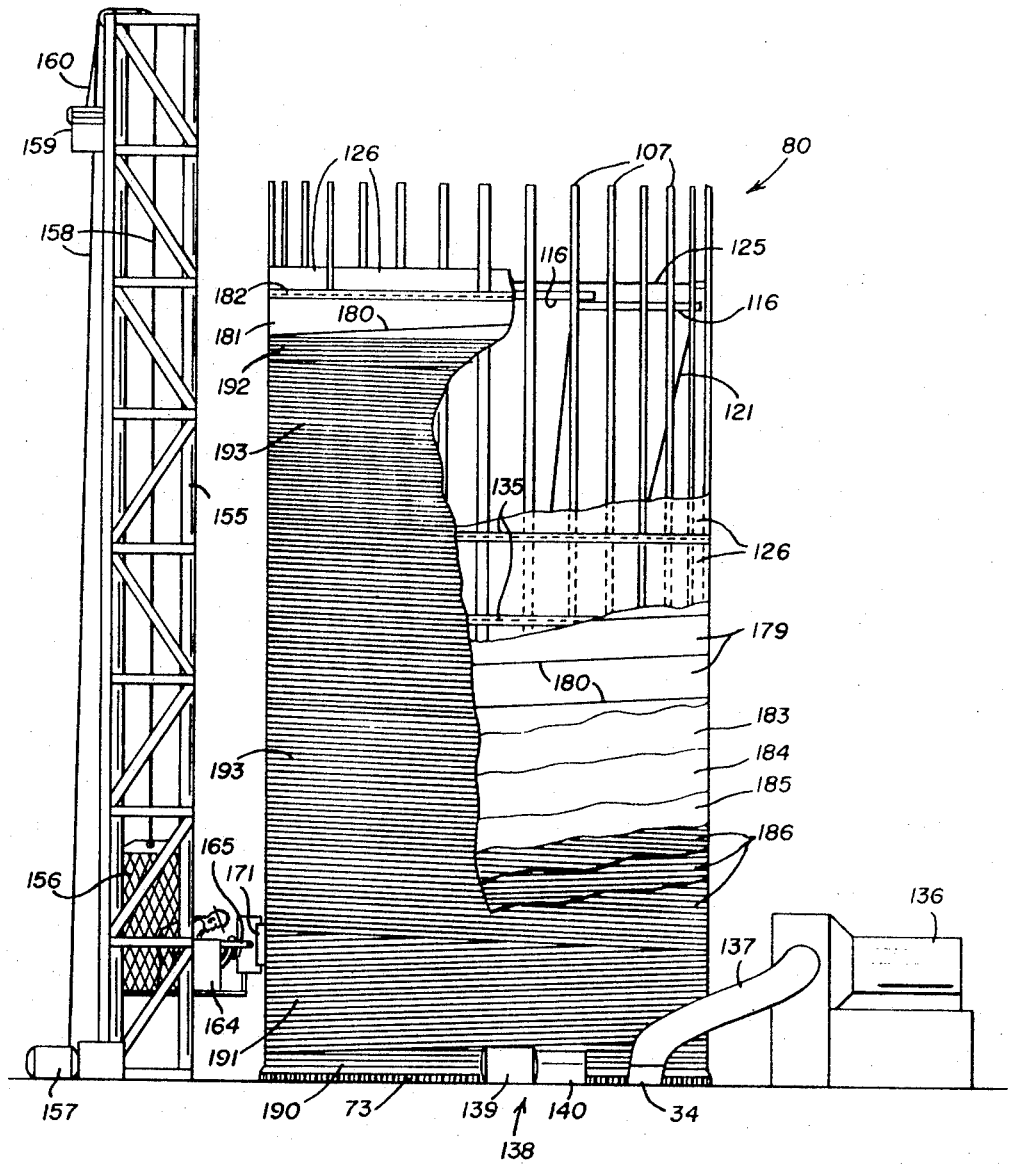
FIG. 10 is an elevational view showing the mandrel in association with the filament winding elevator, the air bearing supply, and the mandrel drive.

The upper portions of the mandrel upright members 107 are secured together to render the upper portion of the mandrel wall a unitary structure, this being accomplished by a plurality of angle section ring or chord members 116 which extend around the mandrel periphery in staggered or overlapping relation from member to member, one above the other, as best appears in FIGS. 8 and 10. It will be noted, as best seen in FIGS. 10 and 17, that each chord member 116 extends and is connected to five of the uprights 107, being connected to each, as by the bolt type fasteners 117, FIG. 12.

With reference to FIGS. 8, 12 and 16, a centrally disposed spoke member 87', FIGS. 8 and 16, is shown connected to an upright member 107, the upper portion of which has a clevis bracket 118, FIGS. 8 and 12, secured thereto, as by bolt fasteners 119, FIG. 12. Clevis bracket 118 is mounted on its member 107 just below the associated chord member 116 and has secured thereto a clevis 120 which carries a rod 121. Rod 121, in turn, is connected to a turnbuckle 122, FIGS. 8 and 16, which, in turn, connects with the aforementioned tie rod 98, see also FIG. 4. It will be understood that a similar tie rod and turnbuckle arrangement obtains for the other upright members 107 associated respectively with the other seven central spoke members 87' whereby, upon selective tightening of the turnbuckles, the upper perimeter of the mandrel wall may be made to be concentric with the axis of the mandrel stub shaft 82.

Four additional horizontally disposed tie rod and turnbuckle sets may be employed to assure the circular configuration of the upper wall portion of the mandrel, this arrangement being disclosed, in part, in FIGS. 12 and 16 wherein a tie rod 123 extends from a clevis 120' which is secured to an angle section ring member 116. Rod 123 is connected by a turnbuckle 124, FIG. 16, to a tie rod 125 which extends diametrically to a similar clevis attachment (not shown) to the diametrically opposite chord member 116, in turn, secured to its upright member 107. It will be understood that the other three rods 125 and associated clevis members are identical and spaced peripherally and axially from each other, as required.

With reference now to FIGS. 10, 11, 16 and 21, the entire circular framework wall of mandrel 80 is removably covered with a plurality of sheets 126 of plywood, fiberboard, or the like, which for the purpose may be of the order of 4' x 7' x ¼". As best seen in FIGS. 10 and 16, boards 126 are applied to the metal framework with their length dimension extending peripherally of the mandrel. The boards are placed generally outwardly of the upright members 107, each board being disposed outwardly of three of such members. The end portions of each board, however, respectively are inserted inwardly of the outer leg portions of the spaced I-section members 107 to which the tie rods 121 are secured. By this means, each board is removably secured to the framework and makes side edge-to-edge supporting engagement with the board disposed above and/or below the same in the vertical row of boards secured by the same group of five of the spaced members 107.

In addition to the aforedescribed board-upright interlock, each end portion of each board 126 is clamped to the associated upright member by one or more swivel clamps 127, FIGS. 8 and 13 to 16. Each clamp 127 has an arcuate portion 128 and a radial portion 130 suitably apertured at 129 to receive an associated pivot pin or bolt fastener 131, the radial portion also having an associated stop pin member 132, FIG. 14. The clamps 127 are suitably distributed along the length of its supporting I-section member 107 on opposite sides of its central web 107', FIG. 13, each clamp being operatively disposed thereon by its pin members 131 and 132 which are secured to the central web 107'.

Figure 15:
FIG. 15 is a perspective view of a wedge.
Figure 14:
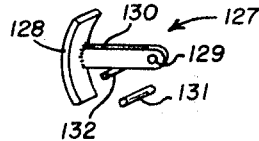
FIG. 14 is a perspective view of a latch type holding member.
Figure 13:
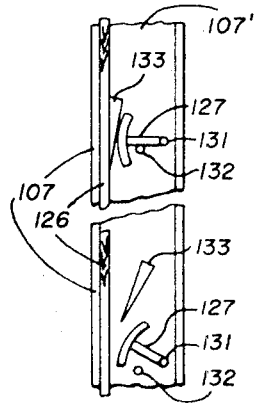
FIG. 13 is a fragmentary view of a mandrel upright member showing fiber board holding details.

In the clamping operation, a suitable wedge 133, FIG. 15, is inserted between the arcuate portion 128 of the clamp 127 and the board 126 and thus forced between the clamp and the board as the clamp is rotated into position against its stop pin 132.

In an alternative arrangement, boards 126 and their clamps 127 and wedges 133 may be omitted yielding a 32-sided cylindrically shaped tank framework to which a release coating is wound as a film around the framework of the mandrel to provide the mandrel support on which the fiber resin sidewall is to be applied. The release coating may be a polyester film, more specifically, a tape containing polyethylene terephthalate and available commercially under the tradename "Mylar."

Figure 18:
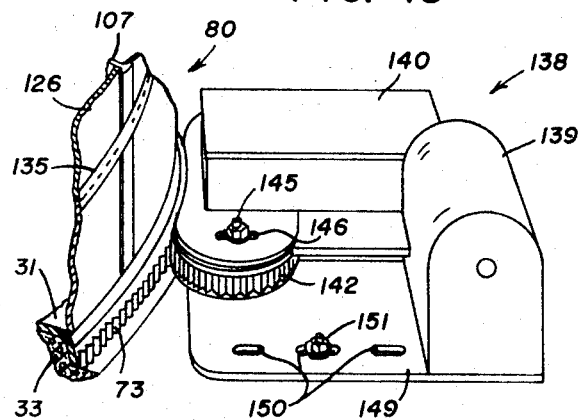
FIG. 18 is a view in perspective of the mandrel drive.

As best seen in FIGS. 10 and 18, suitable strips 135 of "Mylar" tape are applied horizontally to seal the engaging side edges of the adjacently disposed boards 126, the mandrel then being ready for establishment of the air support therefor and subsequent rotation of the mandrel and application thereto of the plastic sidewall 23.

In FIG. 10 there is disclosed a blower 136 which may be of any suitable conventional type capable of delivering of the order of 11,500 cubic feet of air per minute. Blower 136 is disposed adjacent to the mandrel 80 and has an air supply duct 137 which is connected to the air inlet duct 34 which, as aforedescribed, communicates with the air outlets 35, 36 and 37, FIG. 2, which open to the underside of the plastic bottom layer 31, FIG. 6, of the tank 20. Thus, when blower 136 is turned and supplies air to these outlets, the air passes therefrom under pressure between the plastic bottom layer 31 and the raised concrete slab portion 33, FIG. 6, to the perimeter thereof and thence downwardly and outwardly of the skirt 72 to the atmosphere. The resulting cushion of air is thus made to have sufficient pressure to support the plastic bottom layer 31 and the mandrel 80 supported thereon, FIGS. 8 and 11, whereby the mandrel and bottom layer are readily turned about the axis of the axially aligned and mutually secured shafts 82 and 61, FIG. 4, as provided by the spaced bearing supports 55 and 56.

Figure 19:
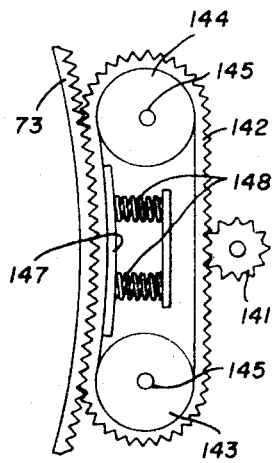
FIG. 19 is a schematic view of the mandrel drive.
Figure 21:
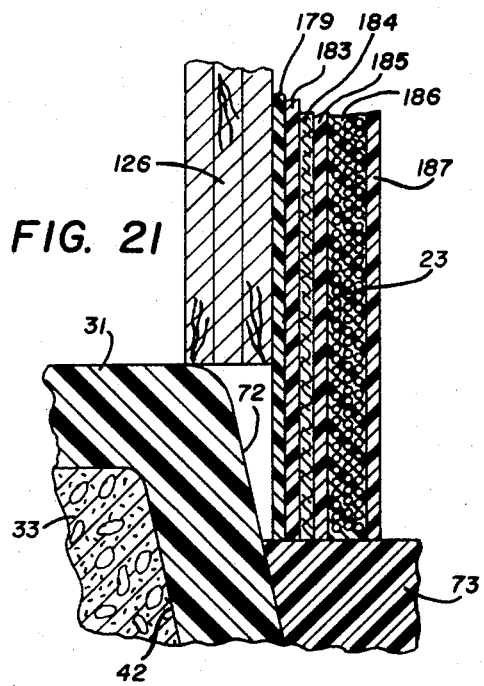
FIG. 21 is a schematic view of the roller assembly.

In FIG. 10 there is also disclosed a mandrel drive generally designated 138 which is mounted adjacent mandrel 80 for driving engagement with its aforedescribed ring gear 73. As best seen in FIG. 18, drive 138 comprises a motor 139 and a drive transmission 140 which includes an output pinion 141, FIG. 19.

Pinion 141 engages and drives a toothed flexible belt 142 which, in turn, engages and drives mandrel ring gear 73, the teeth of the belt matching those of the ring gear. Belt 142 has a smooth inner pulley engaging surface and is trained about a pair of spaced idler pulleys 143 and 144 whose pivotal supports 145 are adjustable relative to the slot 146, FIG. 18, so that the belt 142 may be adjusted relative to the ring gear 73 to provide an optimum meshed driving engagement therebetween. To further enhance this meshed engagement, a spring loaded arcuate pressure plate 147, urged by the springs 148, yieldably urges the portion of belt 142 which extends between the pulleys 143 and 144, into meshed engagement with the mandrel gear.

The motor mounting plate 149 is provided with slotted openings 150 for its fasteners 151 so that the drive 138 may also be adjusted, as required, relative to the mandrel 80 to establish the desired driving connections therebetween.

Figure 20:
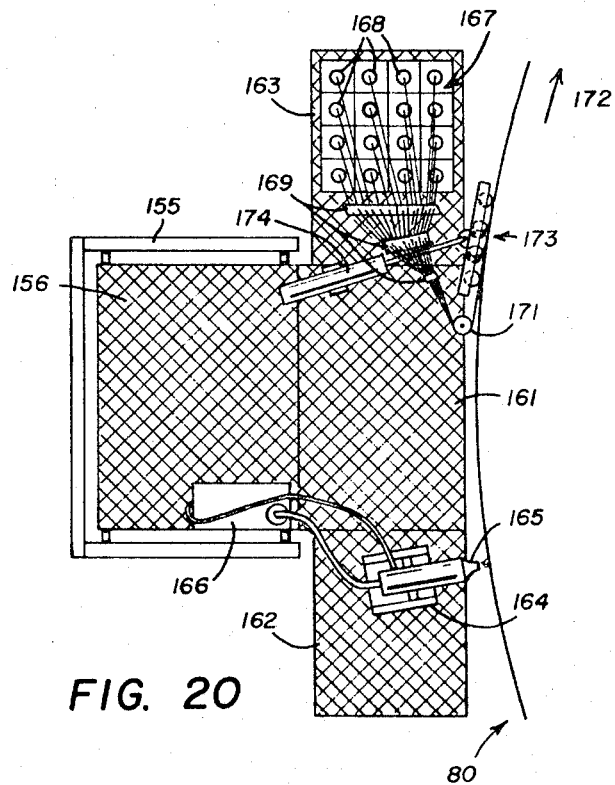
FIG. 20 is a schematic plan view of the elevator and the spray gun and filament winding gear supported thereon.

With reference now to FIGS. 10 and 20, an elevator shaft 155 formed of suitable framework members is now erected adjacent the fiberboard covered mandrel 80 and extended approximately six feet above the upper level thereof. An elevator cage 156, which is large enough to accommodate at least one operator, is supported within shaft 155 for vertical movement up and down the shaft under power of a motor drive 157 having chain, cable, or the like, driving connections 158 with the cage. A counter weight 159 has cable, or the like, connections 160 with the elevator cage so that the load on motor 157 is minimized.

The elevator cage 156 has an outboard floor portion 161 which extends into close proximity to the mandrel 80 and has side wings 162 and 163. Wing 162 has a stand 164 for suitably supporting a gun 165 of conventional design adapted to receive from a source 166 mounted on cage 156 clear resin and glass rovings and to emit from the gun in a spray either the clear resin or the resin together with the chopped glass rovings.

Wing 163 suitably supports a filament supply generally designated 167 which comprises a plurality of sources 168 of glass rovings or filaments from which the filaments are drawn and directed by the guides 169 to a vertically disposed payout spool 171 suitably supported as on the outboard elevator floor 161 at a point thereon where the filaments may pass in near tangency with respect to the mandrel 80 upon rotation thereof in the direction of arrow 172.

A roller assembly 173 is positioned, as shown, where the payed out filaments meet the mandrel so that filaments may be pressed or otherwise worked by the roller assembly into the resin-glass layer applied by the gun 165. The roller assembly is actuated by a hydraulic cylinder unit 174 whereby the same may be moved to and from the mandrel, as required. Alternatively, the required action may be accomplished manually by an operator stationed on the platform 161 in position thereon to manipulate a roller on the glass-resin and thus remove air bubbles therefrom and press the filaments into the resin, as required.

Figure 22:
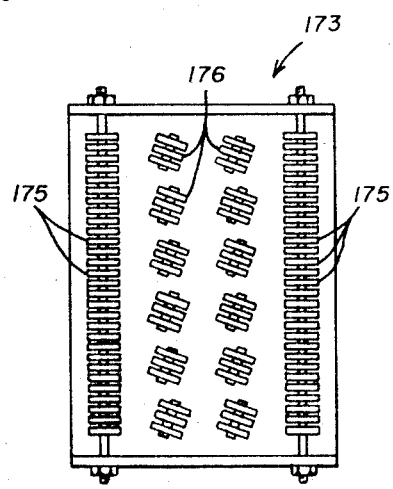
FIG. 22 is a fragmentary sectional view of the filament wound mandrel showing the successive coatings applied thereto.

Referring to FIG. 22, it will be seen that roller assembly 173 may comprise a plurality of rows of disk or washer type rollers of which the rollers 175 of each of the outer rows are rotatively mounted on a common pivot axis which extends substantially parallel to the axis of rotation of the mandrel 80, and of which the rollers 176 of the intermediate rows are mounted in castered groups whose rotative axes are fixed at a predetermined angle with respect to the rotative axes of rollers 175.

In the fabrication of the tank sidewall 23, it will be understood that a single operator stationed in the elevator cage 156 preferably has control of the air supply 136, mandrel drive 138, elevator drive 157, gun 165, filament supply 167, and roller assembly 173. In his first operation of applying a release coating 179, FIG. 21, to the board-covered mandrel framework, the air supply 136 is activated to provide the air cushion support for the mandrel, as aforedescribed, and the mandrel drive 138 and elevator drive 157 are operated to turn the mandrel at a speed of approximately one revolution for each foot of elevation of the elevator cage 156 from ground level.

The release coating 179 preferably is formed of a nonshrinking and non-stretching material suitable for the purpose such, for example, as "Mylar" sheet material having a width of the order of two feet. In the application of such material, a roll of the same is set on an arbor and affixed in a vertical position on the elevator outboard platform 161, and one end of the roll is suitably secured to the mandrel 80, at the bottom thereof, prior to starting rotation of the mandrel. Then, as the mandrel rotates, and the "Mylar" sheet is drawn thereupon from the roll, the upper edge of the sheet is taped to the mandrel boards 126 as successive convolutions of the sheet material are applied to the mandrel. Since the rate of ascent of the elevator is one foot per revolution of the mandrel, an approximately 50% overlap of the two foot material occurs from one convolution to the next, and only the lower edges of the successive convolutions appear as depicted at 180, FIG. 10, except for the upper most convolution 181 whose upper edge is covered by the fastening tape 182, which may be of the same type as tape 135.

In the build up of the resin glass sidewall 23, a variety of coatings are applied over the "Mylar" release coating 179 on the mandrel, these coatings and their purposes being as follows:

(a) A first pressure sprayed coating 183 of pure resin is applied with an appropriate catalyst to leave a smooth interior tank surface;

(b) A second covering 184 of a trade product known as "C-glass" mat together with resin. The "C-glass" mat is a chemical resistant material and is required to seal against any cracks which might develop in the pure resin interior surface (a);

(c) A pressure sprayed coating 185 of resin with chopped glass rovings is next applied which provides a more crack resistant coating than layers (a) or (b);

(d) Several coatings 186 of resin-wound glass filaments to provide maximum strength; and (e) A final coating 187 of pure resin with appropriate catalyst and additives to provide an adequate outer layer to seal against the elements.

Coatings (a) to (e) are applied using a spray gun 165, except that the chopped glass rovings are emitted from the gun only in applying layer (c). In the case of each coating, however, the same is applied in conjunction with continuous rotation of the mandrel and ascent, or descent, of the elevator cage. The glass mat coating (b) is applied directly by the operator into the resin layed down onto the mandrel by the spray gun 165.

In the application of the filament wound coatings (d), the payout spool 171 presents the filaments to the mandrel as a swath from six to twelve inches in width depending upon the number of filament sources 168 used and the number of filaments per strand when the sources individually provide multiple stranded filaments. A first wrapping 190, FIG. 10, of the filaments is worked into the resin layed down by gun 165 as the winding is applied horizontally to the mandrel while the elevator is held at ground level. The elevator is then moved upwardly, as the gun-spraying of the resin and the winding of the filaments continue, to thus lay down successive convoluted wraps 191 of the filaments, the rate of the upward rise being appropriately related to the speed of rotation of the mandrel and the width of the swath of the glass filaments being applied thereto. The elevator will be held at the upper level to form the upper horizontal wrap 192, after which, the successive convoluted wraps 193 are layed down as the elevator cage 156 makes its descent. The several layers of the resin-wound glass filament coatings are thus formed by repeating the up and down traverses of the elevator while the resin and glass rovings are being applied thereto, as aforedescribed, to provide the desired thickness and strength of the sidewall 23. These resin-filament layers 186 cure in one hour or less at ambient temperature of the order of 70° F.

After the final coating (e) has been applied, mandrel 80, or a portion thereof, is disassembled and removed from the filament wound tank, depending upon the manner in which the cover 27, FIG. 1, of the tank is to be made, that is, whether rotation of the tank is to be utilized in the forming of the cover. Assuming first that it is to be utilized, that portion of mandrel 80, including ring member 111, the uprights 107 and chord members 116 together with their associated horizontal and upwardly directed tie rods, cover boards 126 and release coating 179, is disassembled and removed from the tank, thus still leaving within the tank, the stub shaft assembly 81 and the spoke structure 87, 87' together with the tie rods extended downwardly thereto from the top of stub shaft 82, the subsurface bearing shaft assembly also being retained.

In an alternative to this arrangement, the uprights 107 may be formed of two abutting sections bolted together by a bracket splice secured to the adjacent web portions 107' of each spliced beam. The upper sections in such case may extend from just above the chord members 116. Thus, these short upper sections may be removed when cover 27 is to be formed to thereby leave the upper wall portion free of the mandrel structure while leaving the rest of the mandrel intact to aid in the rotational movement of the tank, as before.

In either case, upon removal of the mandrel portion, the tank ports 24 and 25, FIG. 1, are cut, or otherwise formed, in tank sidewall 23 and suitably flanged, as shown. The upper port 24 is then blocked, and a check valve, not shown, is inserted into the lower port 25 so that a thin sheet of plastic material placed over the open top of the tank and suitably secured, as by tape, to the upper edge portion of the tank sidewall, may be caused to balloon outwardly and form a dome in resonse to air admitted under pressure into the tank by way of the check valve.

A suitable framework such, for example, as a catwalk, not shown, is erected to enable an operator to walk over the tank diametrically thereof as the tank rotates and with a gun, such as gun 165, FIG. 20, apply a first coating of resin-chopped glass rovings to the air-ballooned plastic sheet material and the peripheral edge portion thereof secured to the tank sidewall, thereby to form the tank top wall 27 and its peripheral flange 32, FIG. 1.

Stiffner frames, which may be formed of cardboard or other filler material simulating 2" x 4" diametrically extending beams, are next placed on the rigid tank dome thus formed by the first resin-glass coating, and an access hole is cut in the dome and similarly strengthened by a suitable stiffener member. A second coating of resin-chopped glass rovings is now applied to the dome surface and to the stiffener members to thus form the ribs 29, FIG. 1, and access opening (not shown). The access opening is suitably flanged to accommodate the removable cover plate 28, FIG. 1.

Excess plastic sheet material and resin-glass are trimmed from around the upper side wall of the tank in the region of the dome overlap therewith, and a final overspray of resin is applied to the tank to seal the same.

Access to the interior of the tank is now by way of the top manhole and thence by ladder to the tank bottom wall or floor 31. A worker inside the tank has the task of disassembling and removing the remaining portion of the mandrel which must now be removed, piece-by-piece through the manhole. In regard to the sub-surface assembly, bottom 31 is cut through in the region of the sealing ring 67, FIG. 4, the ring also being cut away. It is then possible to loosen the spacer jacks 51 so that the entire assembly of tube 50, bearings 55, 56 and shaft 61 may be removed.

It will be understood that when cover 27 is formed using a scaffolding and resin-glass lay down techniques which do not require rotation of the tank, that all of the mandrel and subsurface bearing structure may be removed before the tank cover 27 is formed.

In either case, the task remains to close the central cavity which is left open upon removal of the subsurface bearing structure. This is accomplished by using a plastic cover plate such as plate 68 for opening 35, FIG. 5, and then applying a coating of resin-chopped glass rovings to integrate the same with the tank bottom wall 31. Alternatively, the center cavity may be filled with cement, and the integrating resin-glass layer then applied both to the cement surface and to the adjacent surface of the bottom wall. In some cases, it may also be desirable to fill the air passageways with cement to provide support for the bottom wall in the region of the air exits 35, 36 and 37, FIG. 2. The tank, of course, settles to the concrete subfloor 33 when the air pressure is cut off from blower 136.

Figure 23:
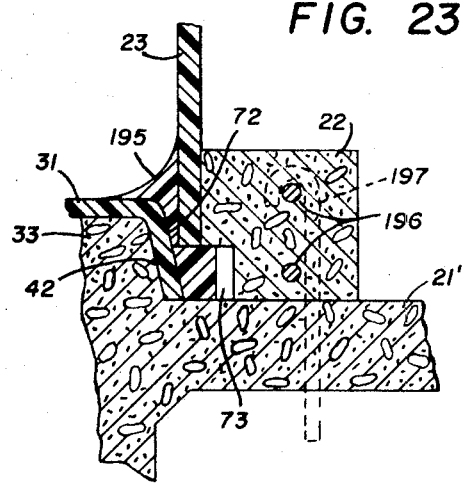
FIG. 23 is a fragmentary sectional view of the completed tank as viewed along the lines 23—23 of FIG. 1.

The worker on the inside of the tank has the further task of forming a resin-chopped glass roving fillet 195, FIG. 23, between the tank sidewall 23 and bottom 31, thereby to provide a smooth and rounded transition between the tank side and bottom walls.

The aforementioned anchoring ring of concrete 22, FIG. 1, is formed, as best seen in FIG. 23, with reinforcing rods 196 which extend peripherally of the tank, and further is formed with hooked rods 197 which engage the upper periperal rod 196 and are seated in holes provided therefor in the slab periphery 21'. Ladder 26, which it will be recalled is fastened to the tank sidewall, is also anchored in ring 22, as aforementioned.

From the foregoing, it should now be fully apparent that examples of the invention have been disclosed which are well adapted to fulfill the aforestated objects of the invention, and while the same are exemplary of the principles thereof, it is not desired to limit the invention to the construction and operation shown and described, but only to the claimed invention as defined by the scope of the appended claims.

What is calimed as new and desired to be secured by Letters Patent of the United States is:

1. An on-site fabricated large capacity tank having integral bottom, top and sidewall formed of fiber filament reinforced resin, said sidewall being filament wound, said bottom and top being formed of chopped fiber reinforced resin, and said bottom having an integrally formed peripheral gear rack.

2. An on-site fabricated large capacity tank having a concrete base and integral bottom, top and sidewall formed of fiber filament reinforced resin, said sidewall being filament wound, said bottom and top being formed of chopped fiber reinforced resin, said bottom having an integrally formed driving member for rotating the tank during the filament winding of said sidewall, said bottom and base comprising an air bearing for admitting air under pressure therebetween to support the tank for rotation during said filament winding of the sidewall.

3. A tank as in claim 2 and further comprising a ring of concrete engaging the lower portion of the sidewall and enclosing said driving member to anchor the tank to the base.

4. A tank as in claim 3, said ring and base having anchoring members embedded therein to secure the same together.

5. An on-site fabricated large capacity tank having a concrete base and integral bottom, top and sidewall formed of fiber filament reinforced resin, said sidewall being filament wound, said bottom and top being formed of chopped fiber reinforced resin, said bottom having an integrally formed driving member for rotating the tank during the filament winding of said sidewall, said top comprising an air ballooned plastic membrane secured to the upper rim portion of said sidewall and forming the inner liner and support surface for the chopped fiber reinforced resin layer on the top.

6. An on-site fabricated large capacity tank having a concrete base and integral bottom, top and sidewall formed of fiber filament reinforced resin, said sidewall being filament wound, said bottom and top being formed of chopped fiber reinforced resin, said bottom having an integrally formed driving member for rotating the tank during the filament winding of said sidewall, said bottom and base comprising an air bearing for admitting air under pressure therebetween to support the tank for rotation during said filament winding of the sidewall and application of said chopped fiber reinforced resin to the top, and said top further comprising an air ballooned plastic membrane which forms the inner liner and support surface for the chopped fiber reinforced resin as the same is applied to the membrane during rotation of the tank.

7. An on-side fabricated large capacity tank having a concrete base and integral bottom, top and sidewall formed of fiber filament reinforced resin, said sidewall being filament wound, said bottom and top being formed of chopped fiber reinforced resin, said bottom having an integrally formed driving member for rotating the tank during the filament winding of said sidewall, said sidewall comprising a pure resin corrosion-resistant inner layer and a plurality of layers of resin wetted-wound glass filaments to provide strength, said wound glass filaments comprising convolutions which extend spirally both upwardly and downwardly of the tank sidewall in successive layers respectively of said resin wetted glass filaments.

8. An on-site fabricated large capacity tank having a concrete base and integral bottom, top and sidewall formed of fiber filament reinforced resin, said bottom and top being formed of chopped fiber reinforced resin and said bottom having an integrally formed driving member for rotating the tank during the filament winding of the tank and the application of the chopped fiber reinforced resin to the top, said sidewall being filament wound peripherally about said bottom and adjacent to said driving member, said sidewall and bottom having a chopped fiber reinforced resin fillet for integrally joining the same together, said top having an air ballooned plastic inner liner and surface support for its chopped fiber reinforced resin layer, and a concrete ring engaging the lower portion of the sidewall and enclosing said driving member to anchor the tank to the base.

References Cited

UNITED STATES PATENTS

| 3,171,563 | 3/1965  | Bernd    | 220—3    |
| 3,282,757 | 11/1966 | Brussee  | 220—3    |
| 3,012,922 | 12/1961 | Wiltshire | 156—28  |
| 3,251,500 | 5/1966  | Archbold | 220—83 X |

OTHER REFERENCES

Justin Bulletin J–65–1, pp. 2, 3, 7 and 8, copy received Nov. 9, 1964, published by Justin Enterprises, Inc., Fairfield, Ohio.

JOHN E. MURTAGH, Primary Examiner

U.S. Cl. X.R.

52—65, 247, 309; 156—175